(12) United States Patent
Kawato et al.

(10) Patent No.: US 7,878,690 B2
(45) Date of Patent: Feb. 1, 2011

(54) LIGHT DIFFUSING PLATE AND LIGHTING DEVICE USING IT

(75) Inventors: Hiroshi Kawato, Chiba (JP); Masami Kogure, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 360 days.

(21) Appl. No.: 11/993,500

(22) PCT Filed: Jun. 21, 2006

(86) PCT No.: PCT/JP2006/312448

§ 371 (c)(1),
(2), (4) Date: May 13, 2008

(87) PCT Pub. No.: WO2006/137459

PCT Pub. Date: Dec. 28, 2006

(65) Prior Publication Data

US 2010/0165619 A1    Jul. 1, 2010

(30) Foreign Application Priority Data

Jun. 24, 2005    (JP) .............................. 2005-185058

(51) Int. Cl.
*F21V 5/00* (2006.01)
(52) U.S. Cl. .................. 362/332; 362/97.1; 362/331; 362/328; 362/246
(58) Field of Classification Search ............. 362/97.1, 362/97.4, 217.02, 249.02, 331–334
See application file for complete search history.

(56) References Cited

U.S. PATENT DOCUMENTS

| | | | | |
|---|---|---|---|---|
| 6,759,113 B1 * | 7/2004 | Tang | ........................... | 428/156 |
| 6,964,497 B2 * | 11/2005 | Greiner | ....................... | 362/241 |
| 2004/0090572 A1 | 5/2004 | Han et al. | | |
| 2004/0218388 A1 * | 11/2004 | Suzuki | ........................ | 362/231 |
| 2005/0122707 A1 * | 6/2005 | Kim | ............................ | 362/29 |
| 2005/0243576 A1 * | 11/2005 | Park et al. | .................... | 362/612 |

FOREIGN PATENT DOCUMENTS

| | | |
|---|---|---|
| JP | 04 275526 | 10/1992 |
| JP | 05 061043 | 3/1993 |
| JP | 08 114704 | 5/1996 |
| JP | 10 282336 | 10/1998 |
| JP | 2002 072204 | 3/2002 |
| JP | 2003 346537 | 12/2003 |
| JP | 2004 163575 | 6/2004 |
| JP | 2004 163945 | 6/2004 |
| JP | 2004 192912 | 7/2004 |
| JP | 2004 265709 | 9/2004 |
| JP | 2005 043516 | 2/2005 |
| JP | 2005 157296 | 6/2005 |

* cited by examiner

*Primary Examiner*—Ali Alavi
(74) *Attorney, Agent, or Firm*—Oblon, Spivak, McClelland, Maier & Neustadt, L.L.P.

(57) ABSTRACT

A light diffusing plate integrally formed with an optical element array on the front and rear surfaces thereof, and a direct lighting device having this light diffusing plate installed on a light reflection plate having a box type shape and provided therein with a light source, whereby a light diffusing plate and a thin direct lighting device are provided which eliminate luminance non-uniformity among a number of light sources (inter-light-sources distance) at a practical level (making luminance uniform), and realize higher luminance (delivering luminance equal to that when conventional prism sheets are laminated).

5 Claims, 3 Drawing Sheets

LIGHT DIFFUSING PLATE AND LIGHTING DEVICE USING IT

TECHNICAL FIELD

The present invention relates to a light diffusing plate having an optical element array which is integrally formed on front and rear surfaces thereof, and to a direct lighting device including the light diffusing plate which is mounted on a light reflecting plate having a box-like shape and incorporating light sources inside thereof.

BACKGROUND ART

Heretofore, a light diffusing plate has been first installed, to erase a lamp image of a light source (fluorescent tube) for a backlight unit, in a liquid crystal display having a large screen.

This light diffusing plate must diffuse transmitted light at a wide angle with respect to its progressing direction.

In order to project the transmitted light over the entire surface of a liquid crystal unit at a high luminance, in general, at least one prism sheet is interposed between the light diffusing plate as a support and the liquid crystal unit. That is, in the direct lighting device of the related art, a light diffusing film underlying the prism film, a prism sheet, a light diffusing film overlying the prism film (optional), and Reflective Polarizer Brightness Enhancement Films (optional) are formed on the light diffusing plate in the stated order.

The light diffusing film overlying the prism film may be omitted from the viewpoint of the optical balance of the whole direct type-lighting system. The light diffusing films are classified into a light diffusing film (underlying the prism film) which underlies the prism sheet to effectively cause incident light on the prism sheet and a light diffusing film (overlying the prism film) which overlies the prism sheet to ease the skirt angle dependence of light emitted from the prism sheet.

This prism sheet is used to condense or diffuse light at an angle effective for improving luminance.

However, in the assembly process of a liquid crystal backlight, two of the prism sheets and other optical functional films (light diffusing film, polarization separation film, and the like) must be set as the case may be, the process is long and complicated, it is costly to manufacture the optical functional films including those prism sheets are high, thereby causing a reduction in productivity. Thus, there are increasing demands, in particular, for a reduction in the number of prism sheets used to improve luminance.

There is proposed a light diffusing plate having irregular patterns of an optical element array, such as a prism shape, which are integrally formed on a light diffusing sheet (refer to Patent Documents 1 and 2, for example). However, the irregular patterns are uniformly formed on the entire surface of one side of the light diffusing sheet and have the same shape regardless of intervals between light sources, so unfortunately, luminance nonuniformity at the time of light emission is large and light emission is not uniform. Particularly, when the irregular patterns are formed by an optical element array formed of V groove-like prisms having a cross-section apex angle of 90°, incident light is not emitted (transmitted) from the emission surface and is reflected toward the light source side due to the total reflection characteristics of the prisms as the irregular patterns get closer to positions right above the light sources from center portions between light sources. Thus, luminance lowers significantly, portions right above the light sources become the darkest, and light is not emitted uniformly. Therefore, it is difficult to put this light diffusion plate into practical use.

Also, attempts are made to form linear Fresnel lenses on the front surface (refer to Patent Document 3, for example). In the case of a linear light source such as a cold-cathode tube, view angle dependence is high and front luminance is uniform and high, but when observed in a oblique direction, luminance lowers significantly and the shadow of a light source becomes distinct.

The attempt to reduce the thickness of the existing direct type-backlighting system has limitations. Accordingly, there is proposed a method of constituting a backlight system having a large screen by installing a plurality of light guide plates such as tandem type-backlights (refer to Patent Documents 4 and 5, for example). The thickness of the backlight system can be reduced, but a plurality of light guide plates are necessary to be used, thereby making it difficult to reduce the weight of the system.

Patent Document 1: JP 2004-163575 A
Patent Document 2: JP 2004-163945 A
Patent Document 3: JP 05-61043 A
Patent Document 4: JP 2003-346537 A
Patent Document 5: JP 2002-72204 A

DISCLOSURE OF THE INVENTION

Problems to be Solved by the Invention

It is an object of the present invention to provide a light diffusing plate which eliminates luminance nonuniformity (making luminance uniform) among the number of light sources (interval between light sources) at a practical level and achieves high luminance (equal to luminance generated when a plurality of conventional prism sheets are laminated) by integrating a light diffusing plate substrate with an optical element array, and a thin direct lighting device having the light diffusing plate.

Means for Solving the Problems

The inventors of the present invention have conducted intensive studies to attain the above-mentioned object of the invention. As a result, they have found that the above-mentioned object can be attained by a light diffusing plate including an optical element array which is integrally formed on front and rear surfaces of a light diffusing plate substrate to be mounted on a direct lighting device. The present invention has been accomplished based on this finding.

That is, the present invention provides:

(1) a light diffusing plate including an optical element array integrally formed on front and rear surfaces of a light diffusing plate substrate to be mounted onto a direct lighting device;

(2) the light diffusing plate as described in Item 1, in which the optical element array is a microlens array or a prism arrays according to a type of light source;

(3) the light diffusing plate as described in Item 2, in which the microlens arrays are lenticular lens arrays;

(4) the light diffusing plate as described in Item 3, in which an arc at the end R of each lenticular lens arrays formed on the front surface of the light diffusing plate substrate is ⅓ to ½ of a circle and an arc at the end R of each lenticular lens arrays formed on the rear surface of the light diffusing plate substrate is 1/10 to ⅓ of a circle;

(5) the light diffusing plate as described in Item 1, in which a material constituting the light diffusing plate substrate is a transparent resin or light diffusing resin composition having a total light transmittance of 75 to 96%;

(6) a direct lighting device including the light diffusing plate as described in any one of Items 1 to 5 mounted on a light reflecting plate having a box-like shape and incorporating light sources inside thereof;

(7) the direct lighting device as described in Item 6, in which one two or more of optical films are formed on the light diffusing plate;

(8) the direct lighting device as described in Item 6 or 7, in which the light reflecting plate has a wavy or parabolic cross-section; and (9) the direct lighting device as described in Item 7 or 8, in which the optical film formed on the light diffusing plate is a light diffusing film having a total light transmittance of 80% or higher.

EFFECT OF THE INVENTION

According to the present invention, there can be provided a light diffusing plate which eliminates luminance nonuniformity (making luminance uniform) in the number of light sources (interval between light sources) at a practical level and achieves high luminance (equal to luminance generated when a plurality of conventional prism sheets are laminated) by integrating a light diffusing plate substrate with an optical element array, and a thin direct lighting device having the light diffusing plate.

DESCRIPTION OF SYMBOLS 1,1': optical element array
2a: light diffusing plate substrate made of a light diffusing resin composition
2b: light diffusing plate substrate made of a transparent resin
3: light reflecting plate
4: linear light source (cold-cathode tube)
5: point light source (LED light source)
6,6': lenticular lens
7: metal plate

BEST MODE FOR CARRYING OUT THE INVENTION

A light diffusing plate of the present invention has an optical element array which is integrally formed on front and rear surfaces of a light diffusing plate substrate to be mounted on a direct lighting device.

Figure 1:
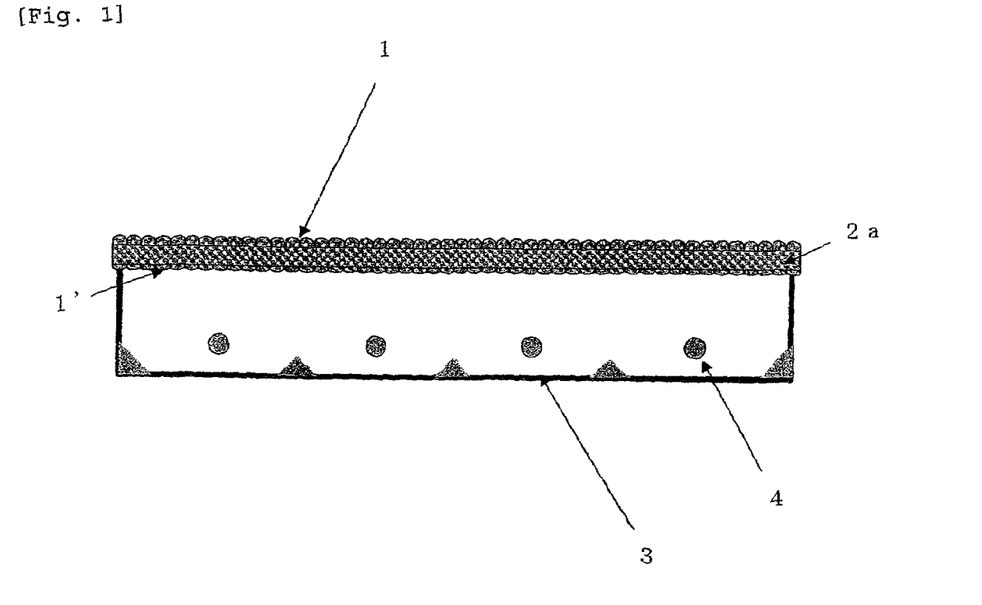
FIG. 1 is an example of a cross-sectional view of a direct lighting device of the present invention when linear light sources (cold-cathode tubes) are used as light sources.
Figure 2:
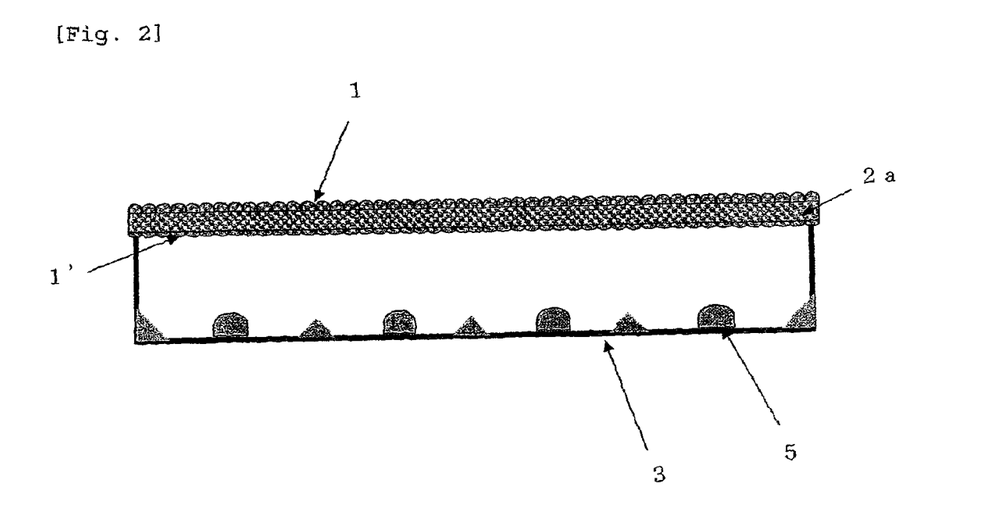
FIG. 2 is an example of a cross-sectional view of a direct lighting device of the present invention when point light sources (LED light sources) are used as light sources.

FIGS. 1 and 2 are cross-sectional views illustrating different embodiments of direct lighting devices including the light diffusing plate of the present invention. As shown in FIGS. 1 and 2, the light diffusing plate of the present invention has a structure that optical element arrays 1 and 1' are integrally formed on front and rear surfaces of a light diffusing plate substrate 2a (2b). As will be described later, reference numeral 3 denotes a light reflecting plate, 4 denotes a linear light source, and 5 denotes a point light source.

As the optical element arrays formed on the front and rear surfaces of the light diffusing plate substrate, a combination of the optical element arrays to be formed on the front and rear surfaces thereof may be suitably selected according to light emission characteristics (directivity) of each light source. By mounting the optical element arrays having light diffusing and condensing functions on both front and rear surfaces of the light diffusing plate substrate, a planar lighting device having uniform luminance distribution characteristics can be obtained when any types of light sources such as the linear light sources 4 shown in FIG. 1 or the point light sources 5 shown in FIG. 2 are used.

As for the type of light sources used in the direct lighting device, linear light sources such as hot-cathode tubes or cold-cathode tubes or point light sources such as LED's (optical semiconductor devices) can be preferably used.

In the case of the linear light sources, depending on the type of each light source, the directivity of each light source, the brightness of each light source luminance, the interval between light sources, the distance from the light source to the light diffusing plate, and the characteristics of the light reflecting plate in use, a luminance distribution can be made uniform by installing convex lenses or a concave lenses, a microlens array such as lenticular lenses, or a prism lens array on the front and rear surfaces of the light diffusing plate substrate.

In the case of the point light source such as LED, a planar lighting device exhibiting a uniform luminance distribution can be obtained by installing the optimal optical element array on the incident and emission surfaces with the point light sources as the center thereof in accordance with the light emission characteristics (directivity) of LED. LED emits extremely straight light due to its high directivity, so the shape of the optical element array is selected according to the directivity of LED and arranged, thereby making it possible to make a luminance distribution uniform.

Figure 3:
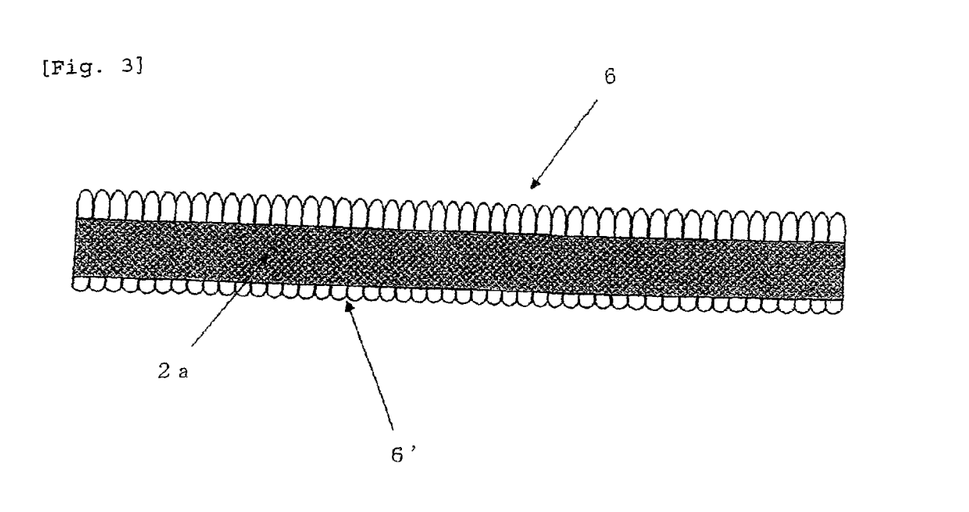
FIG. 3 is an example of a cross-sectional view of a light diffusing plate including a light diffusing resin composition and having an optical element array which are integrally formed on the front and rear surfaces thereof.
Figure 4:
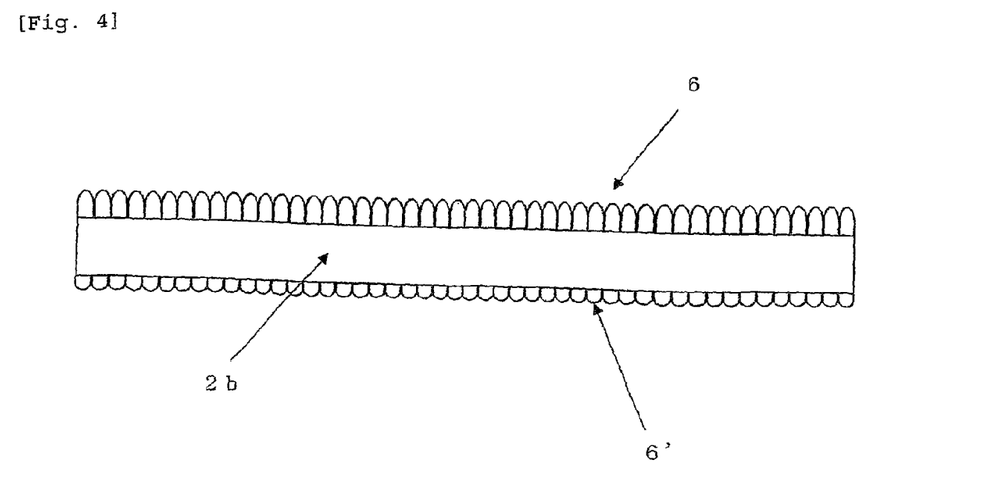
FIG. 4 is an example of a cross-sectional view of a light diffusing plate including a transparent resin and having an optical element array which is integrally formed on the front and rear surfaces thereof.

FIGS. 3 and 4 are cross-sectional views illustrating different embodiments of light diffusing plates of the present invention (different in the material of the light diffusing plate substrate). Reference symbols 2a and 2b denote a light diffusing plate substrate made of a light diffusing resin composition and a light diffusing plate substrate made of a transparent resin, respectively, and 6 and 6' denote lenticular lenses.

As the optical element array formed on the front and rear surfaces of the light diffusing plate substrate, as shown in FIG. 3 and FIG. 4, lenticular lenses 6 and 6' arranged orthogonal to each other or parallel to each other on the front and rear surfaces, microlens arrays formed on the both surfaces or a combination of a lenticular lens array and a microlens array formed on the front and rear surfaces may be suitably selected according to the arrangement of LED light sources (point light sources).

The light diffusing plate of the present invention is preferably such that the above optical element array is a microlens array or a prism lens array according to the type of the light sources.

The optical element array which can be used in the present invention is, for example, a microlens array or a prism lens array. Preferred examples of the microlens array include an assembly of spherical lenses, an assembly of aspherical lenses, in which a plurality of fish-eye lenses, convex lenses, concave lenses, bale-like lenses, and cylindrical lenses are arranged on a plane. When a point light source such as LED is used, those optical element arrays can be preferably used. Of those, lenticular lenses having the same cross-sectional form are preferred.

The pattern shape of the microlens array or prism lens array may be suitably selected according to the type of each light source, the directivity of each light source, the brightness of each light source luminance, the interval between light sources, the distance from the light source to the light diffusing plate, and the shape of the light reflecting plate in use. A pitch of 10 to 200 µm, a radius of several tens of µm to 300 µm, a square alignment, a delta alignment, and lenticular lenses may be used.

The height of each element of the optical element array is preferably 5 to 300 µm.

When the height is larger than 300 µm, luminance improves but the shade of the prism lens array becomes distinct and display quality deteriorates. When the height is smaller than 5 µm, light diffusion characteristics improve but the condensing function lowers, thereby reducing luminance. In a backlighting device for liquid crystal TV, the height is preferably 20 to 300 µm, more preferably 5 to 250 µm.

The prism lens array consists of V groove-, square pyramid-, or polygonal pyramid-like prism lenses. In the case of V groove-like prism lenses, they may have a curved line such as an undulated line to reduce an interference fringe. The cross-sectional apex angle of the V groove is suitably selected from a range from 30 to 150° according to view angle dependence, the type of each light source, the brightness of each light source luminance, the interval between light sources, and the distance from the light source to the light diffusing plate. For example, in the case of a cold-cathode tube which is a linear light source, a V groove-like prism lens having a cross-section apex angle of 90±60° or a square pyramid-like prism lens is preferred. Of those, luminance can be increased at a cross-section apex angle of 90±30°. The cross-sectional apex angle is preferably 90±20°, more preferably 90±10° in the vertical direction of the screen where a narrow view angle is allowed. The end of the cross-sect apex may be slightly made round like R to provide light diffusion properties. The radius of the end R may be selected according to the pitch of the prism array. In the case of a prism array having a pitch of 100 µm or less, the radius is preferably in the range of 3 to 100 µm and suitably selected from the above range according to the required light diffusion properties.

In the case of a lighting device in which linear light sources are arranged in a horizontal direction of the screen of a liquid crystal TV, the narrow view angle in the view angle characteristics in the horizontal direction of the screen can be reduced by aligning the linear direction of the linear prism lens array with the linear direction of the linear light sources.

In the present invention, the microlens array is more preferably a lenticular lens array as shown in FIGS. 3 and 4.

The lenticular lens array is obtained by arranging a plurality of cylindrical lenses on a plane in one direction, and the industrial utility value thereof is high because it can be easily manufactured.

A lenticular lens array having a pitch of less than 300 µm and a cross-sectional form with a radius of the end R of 300 µm or less can be preferably used. When a lenticular lens array having a pitch of more than 300 µm is used on the incident surface, the amount of a totally reflected component increases significantly and the amount of an incident component decreases, thereby causing a reduction and nonuniformity in luminance. The pitch is more preferably 200 µm or less, much more preferably 100 µm or less.

The radius of the end R is preferably 200 µm or less. When the radius of the end R is larger than 200 µm, light diffusion performance deteriorates and uniformity in luminance is lost. The radius of the end R is more preferably 50 µm or less, much more preferably 20 µm or less. The cross-sectional form of the lenticular lens which is formed on each of the front and rear surface of the light diffusing plate can be suitably selected according to the type of each light source, the arrangement of the light sources, the luminance of each light source, the interval between light sources, and the distance from the light source to the light diffusing plate.

Taking a case where cold-cathode tube light sources (linear light sources) are arranged at intervals of about 25±5 mm as an example, when lenticular lenses having a cross-sectional form with low light diffusion properties (for example, a pitch of 10 to 50 µm, a radius of the end R of 10 to 50 µm, an arc at the end R which is ¼ of a circle) are arranged on the incident surface of the light diffusing plate, and lenticular lenses having a cross-sectional form with high light diffusion properties (for example, a pitch of 50 to 100 µm, a radius of the end R of 100 to 200 µm, an arc at the end R which is ½ of a circle) are arranged on the emission surface, high and uniform luminance can be realized. The arc at the end R of the lenticular lens array on the emission surface (front surface) is preferably made larger than the arc at the end R of the lenticular lens on the incident surface (rear surface), and the arc at the end R of the lenticular lens on the emission surface (front surface) is desirably about ⅓ to ½ of a circle. When lenticular lenses having lower light diffusion properties than those of lenticular lenses having an arc at the end which is ⅓ of a circle are used, luminance uniformity lowers. The arc at the end R of the lenticular lens array on the incident surface (rear surface) is desirably about 1/10 to ⅓ of a circle. When a lenticular lens array having an arc at the end R with high light diffusion properties is used on the incident surface, not only a moire fringe is formed but also the effect of improving luminance is not obtained. In the lenticular lens array, a combination of front and rear surfaces of these arcs at the ends R may be suitably selected according to the type of each light source, the brightness of each light source luminance, the interval between light sources, and the distance from the light source to the light diffusing plate.

In the light diffusing plate of the present invention, the light diffusing plate substrate on which the optical element array is not formed is preferably a transparent resin sheet (FIG. 4) or a sheet made of a light diffusing resin composition (FIG. 3) having a total light transmittance of 75 to 96%.

As for the optical properties of the light diffusing plate substrate, a reduction in luminance can be suppressed by setting the total light transmittance of the light diffusing plate substrate itself on which the optical element array is not formed to 75 to 96%. When the total light transmittance is lower than 75%, the amount of a useless scattered light component which is not incident upon the prism elements increases due to high light diffusion properties, thereby reducing luminance. When the total light transmittance is higher than 96%, the shades of the light sources tend to become distinct. The total light transmittance, depending on the pitch, definition, or the like of the optical element array formed on both surfaces of the light diffusing plate substrate, is preferably 80 to 95%, more preferably about 85 to 94%. The light diffusing plate substrate may be made of a resin or glass as long as it has a total light transmittance within this range. However, it is preferably made of a resin from the viewpoint of lightweight and strength. By using a transparent resin or light diffusing resin composition having light diffusion properties within a specific range as a material constituting the light diffusing plate substrate, the shades of the light sources can be reduced.

Examples of the transparent resin used in the light diffusing plate substrate constituting the light diffusing plate of the present invention include polycarbonate resin (PC resin), polymethyl methacrylate resin (PMMA resin), methyl methacrylate-styrene copolymer resin (MS resin), polystyrene resin (PS resin), cyclic olefin polymer (COP resin), polyether sulfones, and modified products thereof. Of those, a suitable material may be selected according to use environment and requirements (heat resistance, water resistance, processability, and the like).

The above transparent resins can be used as the base resin of the light diffusing resin composition used in the light diffusing plate substrate of the present invention, and a suitable one may be selected from those according to the use and environment of a lighting device having the light diffusing plate including the resin composition. For example, PC resin is preferably used in a liquid crystal TV having a screen size of more than 30 inches because the PC resin has dimensional stability to warp and deformation caused by heat and water (moisture absorption) at the time of use.

The light diffusing resin composition includes the above transparent resin as a base resin, to which a light diffusing material is blended. The light diffusing material may be a material having a difference in refractive index of 0.02 or higher compared with the refractive index of the resin selected as the base resin, for example, one selected from a polystyrene resin, a crosslinked acrylic resin, a crosslinked polystyrene resin, a silicone resin, a fluororesin, silica, quartz, titanium oxide, and zinc oxide, preferably particles having an average particle diameter of 1 to 200 μm and/or fibers having a a fiber length/fiber diameter (L/D) of 2 or higher.

The amount of the light diffusing material, depending on the type of the light diffusing material, is preferably 0.01 to 10 parts by mass, more preferably 0.1 to 8 parts by mass, much more preferably 0.2 to 5 parts by mass with respect to 100 parts by mass of the base resin. When the amount is smaller than 0.01 parts by mass, the light diffusing material becomes inferior in light diffusion properties, whereas when the amount is larger than 10 parts by mass, the total light transmittance lowers and the effect of improving luminance by the optical element array cannot be obtained.

When a polycarbonate resin is used as the above transparent resin, at least one selected from thermoplastic acrylic resin particles, crosslinked acrylic resin particles, and quartz fibers is particularly preferably used in combination as the light diffusing material.

The light diffusing resin composition may be blended with an antioxidant, light resisting agent, stabilizers, plasticizer, and release agent in addition to the light diffusing material. The total light transmittance can be controlled to any level by the refractive index, particle diameter, and amount of the light diffusing material.

The thickness of the light diffusing plate substrate on which the optical element array is not formed is preferably about 0.5 to 5 mm. When the thickness is smaller than 0.5 mm, it is difficult to ensure sufficient light diffusion properties enough to hide the shades of the light sources, whereas when the thickness is larger than 5 mm, the weight greatly increases, thereby impairing the lightweights of mounted devices. Form the view point of ensuring the stiffness of the light diffusing plate substrate, the thickness is more preferably about 1 to 4 mm, much more preferably about 2 to 3 mm.

When the thickness of the light diffusing plate substrate is 0.5 mm or higher, its stiffness is appropriate, whereby when incorporated in a direct lighting device, the light diffusing plate substrate is not deflected by its own weight and retains its planarity.

When the thickness of the light diffusing plate substrate is 5 mm or less, optical properties do not deteriorate and lightweight is retained. The total light transmittance of this light diffusing plate is 60 to 95%, preferably 65 to 93%.

When the total light transmittance falls within the above range, an optical element array-integrated light diffusing plate which can be put to practical use is obtained.

Examples of the method of manufacturing the optical element array-integrated light diffusing plate of the present invention include:

(1) a method of forming an optical element array by extrusion molding (sheet forming) the above transparent resin or light diffusing resin composition into a sheet and embossing or pressing both surfaces of the obtained light diffusion plate substrate;

(2) a method of forming an optical element array on both surfaces of the light diffusing plate substrate by injection molding or injection compression molding the transparent resin or light diffusing resin composition, or the like by using a mold which has been finely processed to have a predetermined shape;

(3) a method of forming an optical element array having a predetermined shape by forming a transparent curable resin cured by ultraviolet radiation or electron beam into an optical element array having a predetermined shape and bonding the obtained optical element array to both surfaces of the light diffusing plate substrate; and (4) a method of forming an optical element array having a predetermined shape on both surfaces of a plate-like light diffusing plate substrate by laminating a film or sheet having the an optical element array having a predetermined shape.

As a method to laminate the film or sheet, a method in which a continuous transparent resin film having a predetermined shape is fed and laminated on both surfaces of a sheet-like light diffusion layer having a predetermined thickness formed by melt extrusion molding, and a method in which a light diffusing plate substrate obtained by melt extrusion and a continuous transparent resin film having an optical element array with a predetermined shape are bonded together by using an adhesive, may be used to prevent the luminance of the film or sheet from becoming lower than the luminance of the light diffusion layer alone. The method preferred from the viewpoint of productivity is an injection molding method in which a raw material pellet of a transparent resin or light diffusing resin composition is directly formed into an optical element array on both surfaces of the light diffusing plate by using a mold which has been finely processed to have a predetermined shape. As for a large screen having a size of more than 37 inches, a combination of extrusion molding and emboss rolling is preferred.

As shown in FIGS. 1 and 2, the direct lighting device of the present invention is characterized in that the light diffusing plate of the present invention is installed on a light reflecting plate having a box-like shape and incorporating light sources inside thereof. This direct lighting device preferably consists of a light reflecting plate having a wavy or parabolic cross-section and the light diffusing plate of the present invention.

As for the light reflecting plate having a box-like shape, a light reflecting plate is installed in a box-like housing constituted of a steel plate chassis, a lamp holder, and the like, or a box-like housing is made of the same light reflecting material as the light reflecting plate.

In a combination of a light reflecting plate and a light diffusing plate constituting the direct lighting device, the light reflecting plate may have a planar form, but when a light reflecting plate having a wavy or parabolic cross-section and the light diffusing plate of the present invention are used in combination, a more uniform luminance distribution and higher luminance can be achieved than when a light reflecting plate having a planar form is used.

Depending on the type of each light source, the directivity of each light source, the interval between light sources, and the distance from the light source to the light diffusing plate, when the light reflecting plate having a wavy or parabolic cross-section is used, it is possible to control light to be incident upon the incident surface of the light diffusing plate effectively and reduce the amount of a component of light which cannot be incident by total reflection.

The light reflecting plate may be made of a metal or resin as long as its light reflectance is 90% or higher, preferably 95% or higher. The material of the light reflecting plate may be suitably selected according to the type of each light source. A metal light reflecting plate is preferably manufactured by depositing aluminum or silver, or coating white on the surface of a metal plate. A polyester stretched porous material or supercritical foam may be used and preferably used in the resin light reflecting plate. A light reflecting composition in which a polycarbonate resin is blended with a white pigment can be easily formed to have a wavy or parabolic cross-section by a thermoplastic resin molding method (vacuum molding, pressure forming, injection molding, etc.) and is useful from the viewpoint of productivity.

At least a light diffusion film and a prism sheet are laminated on an ordinary light diffusing plate in the direct lighting device of the related art, thus the number of parts is large, the assembly process is complicated, and productivity is low. However, when a lighting device is manufactured by using a combination of the optical element array-integrated light diffusing plate of the present invention and the light reflecting plate having the above shape, the same luminance as that of the lighting device of the related art is exhibited, while the number of prism sheets can be reduced, the assembly process can be simplified, and productivity can be improved.

An example of the light reflecting composition in which a polycarbonate resin is blended with a white pigment is a light reflecting composition which includes about 8 to 50 mass % of a white pigment, about 0.1 to 5 mass % of a decomposition inhibitor, and optionally 0.1 to 5 mass % of the total of a flame retardant and a flame retarding aid in a polycarbonate resin.

Various white pigments may be used, for example, titanium oxide, zinc oxide, lithopone, zinc sulfide, and lead white can be used. Of those, titanium oxide is preferred because it has excellent staining power. Titanium oxide may be of a rutile type or anatase type, but the rutile type is preferable because it has excellent heat stability and weatherability. The titanium oxide is preferably surface-treated with various surface treating agents such as hydrate alumina, silica, or zinc.

The decomposition inhibitor is preferably an organosiloxane such as an alkyl hydrogen silicone or alkoxysilicone having a reactive group such as methoxy group or ethoxy group, and examples of the alkoxysilicone include methoxysilicone and ethoxysilicone.

Examples of the flame retardant used optionally include known compounds such as organic metal salt compounds, inorganic silicic acid and silicate compounds thereof, phosphate-based compounds, boron-based compounds, triazine-based compounds, and polyorganosiloxane-based compounds. As the flame retarding aid, Teflon resin (trademark) can be used as a dripping preventing agent.

In the direct lighting device of the present invention, a plurality of optical films laminated on at least one surface of the light diffusing plate preferably include at least one light diffusion film having a total light transmittance of 80% or higher.

The plurality of optical films include at least one, preferably two light diffusion films underlying the prism film which are useful for improving luminance and making luminance uniform. The total light transmittance of the light diffusion films underlying the prism film is preferably 80% or higher. When the total light transmittance is lower than 80%, luminance is made uniform but the effect of improving luminance is not obtained. The total light transmittance is more preferably 85% or higher, much more preferably 89 to 93%.

In the direct lighting device of the present invention, the light diffusing plate of the present invention, (two) light diffusion films overlying the prism film, and Reflective Polarizer Brightness Enhancement Films (optional) are laminated in the stated order to achieve the same luminance and uniformity as those of the direct lighting device of the related art. A prism sheet may be used in place of one of the above (two) light diffusion films overlying the prism film.

EXAMPLES

In the following, a preferred embodiment of the method of manufacturing the light diffusing plate of the present invention will be described in detail, taking a transparent polycarbonate resin as a typical example.

1) Preparation of Light Diffusing Resin Composition

Manufacturing Example 1

5 parts by mass of crosslinked acrylic beads (PMMA, XX03BZ of Sekisui Plastics Co., Ltd., average particle diameter of 100 μm) as a light diffusing material were mixed with 100 parts by mass of a polycarbonate resin (FN1900A manufactured by Idemitsu Kosan Co., Ltd.) as a thermoplastic transparent resin, and the resulting mixture was molten at 280° C. and kneaded by a kneading extruder having a bore diameter of 40 mm to obtain a pellet of a light diffusing resin composition having a total light transmittance of 93.8%.

Manufacturing Example 2

A pellet of a light diffusing resin composition having a total light transmittance of 93.5% was obtained in the same manner as in Manufacturing Example 1 except that 1 part by mass of crosslinked acrylic beads (MBX-20 manufactured by Sekisui Plastics Co., Ltd., average particle diameter of 20 μm) was used as the light diffusing material.

Manufacturing Example 3

A pellet of a light diffusing resin composition having a total light transmittance of 85.0% was obtained in the same manner as in Manufacturing Example 1 except that 2 parts by mass of crosslinked acrylic beads (MBX-20 manufactured by Sekisui Plastics Co., Ltd., average particle diameter of 20 μm) were used as the light diffusing material.

Manufacturing Example 4

A transparent resin having a total light transmittance of 91.5% was used directly as a raw material resin for a light diffusing plate substrate without blending a light diffusing material with a polycarbonate resin as a thermoplastic transparent resin.

Manufacturing Example 5

A commercially available MS resin having a total light transmittance of 94% (Planelloy (trademark) KM-6A manufactured by Japan A&L Co., Ltd.) which is a thermoplastic transparent resin was used directly as a raw material resin for a light diffusing plate substrate.

Manufacturing Example 6

A commercially available cyclic olefin polymer (COP resin) having a total light transmittance of 92.0% (ZEONOR (trademark) 1060R manufactured by ZEON Corporation.) which is a thermoplastic transparent resin was used directly as a raw material resin for a light diffusing plate substrate.

Manufacturing Example 7

A commercially available methyl methacrylate resin (PMMA resin) having a total light transmittance of 93.5% (MG5 manufactured by Sumitomo Chemical Co., Ltd.) which is a thermoplastic transparent resin was used directly as a raw material resin for a light diffusing plate substrate.

2) Manufacture of Light Diffusing Plate Substrate by Extrusion Molding

The pellets obtained in the above Manufacturing Examples 1 to 7 were extrusion molded at a molding temperature of 260° C. by using an extruder having an bore diameter of 65 mm to manufacture sheets having a width of 60 mm and a thickness of 2 mm for all Examples, Comparative Examples, and Reference Examples except that the thickness of a sheet of Comparative Example 6 was 1 mm.

3) Manufacture of Light Diffusing Plate (Formation of Optical Element Array)

(i) Thermal Press Molding

A piece measuring 584×584 mm was cut out from each of the light diffusing plate substrates obtained by the method 2), and a microlens array was formed on both surfaces thereof by thermal pressing the piece at a molding temperature of 220° C. using the following stamper for forming an optical element array. The contour of a molded product obtained by the above step was processed by a router to obtain a light diffusing plate having a 21.5-inch integrated optical element array (a width of 446 mm and a length of 335 mm). When the optical element array was not formed, the piece having the above size, which was cut out from the sheet after extrusion, was used.

(ii) Injection Molding

Each of the resin pellets obtained in the above Manufacturing Examples 1 to 7 was used and injection molded by using a 450-ton injection compression molding machine having the above microlens array stampers on both fixed and movable surfaces of a mold (manufactured by Niigata Machine Techno Co., Ltd.) to manufacture a light diffusing plate having the above a 21.5-inch microlens array (a width of 446 mm and a length of 335 mm) on both front and rear surfaces thereof. A suitable molding temperature and a suitable mold temperature were selected according to the type of a resin constituting the light diffusing plate substrate to carry out molding. When the resin was a polycarbonate resin, molding was carried out at a molding temperature of 300° C. and a mold temperature of 120° C. In the case of MS resin, molding was carried out at a molding temperature of 260° C. and a mold temperature of 70° C., and in the case of COP resin, molding was carried out in a nitrogen atmosphere at a molding temperature of 290° C. and a mold temperature of 90° C.

The stamper used to form the optical element array had the following specifications (shape after transfer with an estimated transfer rate for each molding method).

(i) Lenticular Lens Array

R1: incident surface of light diffusing plate; radius of the end R of 20 (μm), pitch of 20 μm, arc at the end R of a ¼ circle R2: emission surface of light diffusing plate; R2; radius of the end R of 50 (μm), pitch of 100 μm, arc at the end R of a ½ circle (ii) V Groove-Like Prism Lens Array Pitch of 100 μm, Apex Angle of 90°

4) Manufacture of Light Reflecting Housing

A light reflecting composition including a polycarbonate resin as a matrix resin (Taflon (trademark) URC2501 manufactured by Idemitsu Kosan Co., Ltd.) was dried at a temperature of 120° C. for 5 hours and molded into a light reflecting housing in which a light reflecting plate, a lamp holder, and a wavy light reflecting plate having an isosceles triangular cross-section with a height of 10 mm and a bottom length of 18 mm on a light reflecting surface were integrated with one another (screen size of 21.5 inches, outer shape: 462 (width)× 358 (length)×20 (height) mm) by a 450-ton injection molding machine at a molding temperature of 290° C. and a mold temperature of 90° C. and used to assemble a lighting device.

A light reflecting housing having a flat reflection bottom was also formed under the same conditions except that a mold having a wavy reflection bottom was a flat plate.

5) Constitution and Assembly of Lighting Device

A 3 mm-diameter cold-cathode tube (manufactured by Harrison Toshiba Lighting Co., Ltd.) was used as a linear light source.

The light diffusing plate and the light reflecting plate (light reflection housing) obtained in above 3) and 4) were used, 12 cold-cathode tubes were arranged by using a silicone rubber packing fitted to a lamp holder and the terminals of the cold-cathode tubes to ensure that the interval between light sources became 26.7 mm and the distance between the bottom of the light reflecting plate and the front surface of the cold-cathode tube became 1.5 mm, and the light diffusing plate was mounted onto the light reflection housing. A light diffusion film for liquid crystal TVs was mounted onto the obtained lighting device and a portion around the emission surface of the lighting device was fixed by a metal frame.

6) Evaluation of Performance (i) The total light transmittance of the light diffusing plate was measured in accordance with JISK7105.

(ii) The lighting device obtained in above 5) was turned on at 12 V and 6 A at room temperature by using an inverter.

As for the luminance characteristics of the lighting device of the present invention, front luminance at a total of 400 locations at the centers between light sources and right above the light sources in the areas of 4 cold-cathode tubes located at the center of the lighting device was measured by using a luminance/streak nonuniformity measuring instrument (Eye Sclae-3W luminance, color shading, and streak nonuniformity analyzer manufactured by Eye Systems Co., Ltd.) and the average of the measurement data was taken as an evaluation index.

(iii) As for luminance uniformity, a value obtained by dividing the highest luminance by the lowest luminance was taken as an evaluation index.

(iv) As for view angle dependence, luminance nonuniformity and the shadings of the light sources were evaluated with visual observation at an angle of 35° from the normal of the screen in the vertical direction of the screen. ○ (satisfactory) represents that they are observed almost uniform and X (unsatisfactory) represents that they are observed nonuniform.

(v) As for the thickness of the lighting device product, it is represented by the distance from the light reflecting plate to the light diffusing plate.

Example 1

After the pellet of the light diffusing resin composition obtained in Manufacturing Example 1 was extrusion molded into a light diffusing plate substrate having a thickness of 2 mm, a light diffusing plate having lenticular lenses R1 and R2 formed on front and rear surfaces was obtained by thermal press molding described in 3)-(i). After a light reflecting housing having a flat bottom of a light reflecting plate and incorporating 12 cold-cathode tubes and the above light diffusing plate were mounted, two light diffusion films (Opals (trademark) BS-701 to be placed under the prism film manufactured by Keiwa Co., Ltd.; total light transmittance of 89%) were placed on the light diffusing plate to assemble a lenticular lens-integrated light diffusing plate lighting device and the device was evaluated for the performance.

The obtained lighting device had an average luminance of 10,000 cd/m$^2$, a luminance uniformity of 1.10, and excellent view angle dependence.

Example 2

The procedure of Example 1 was repeated except that the light diffusing resin composition obtained in Manufacturing Example 2 was used in place of the light diffusing resin composition obtained in Manufacturing Example 1 and a light reflection housing having a wavy bottom was used in place of the light reflection housing having a flat bottom of a light reflecting plate. The obtained direct lighting device had an average luminance of 11,400 cd/m$^2$, a luminance uniformity of 1.05, and excellent view angle dependence.

Example 3

The procedure of Example 1 was repeated except that the light diffusing resin composition obtained in Manufacturing Example 3 was used in place of the light diffusing resin composition obtained in Manufacturing Example 2.

The obtained direct lighting device had an average luminance of 9,600 cd/m$^2$, a luminance uniformity of 1.02, and excellent view angle dependence.

Example 4

The procedure of Example 1 was repeated except that resin mentioned in Manufacturing Example 4 was used in place of the light diffusing resin composition obtained in Manufacturing Example 2.

The obtained direct lighting device had an average luminance of 10,300 cd/m$^2$, a luminance uniformity of 1.10, and excellent view angle dependence.

Example 5

The procedure of Example 1 was repeated except that resin mentioned in Manufacturing Example 5 was used in place of the light diffusing resin composition obtained in Manufacturing Example 2.

The obtained direct lighting device had an average luminance of 10,500 cd/m$^2$, a luminance uniformity of 1.07, and excellent view angle dependence.

Example 6

The procedure of Example 1 was repeated except that resin mentioned in Manufacturing Example 6 was used in place of the light diffusing resin composition obtained in Manufacturing Example 2.

The obtained direct lighting device had an average luminance of 10,700 cd/m$^2$, a luminance uniformity of 1.11, and excellent view angle dependence.

Example 7

The procedure of Example 1 was repeated except that resin mentioned in Manufacturing Example 7 was used in place of the light diffusing resin composition obtained in Manufacturing Example 2.

The obtained direct lighting device had an average luminance of 10,600 cd/m$^2$, a luminance uniformity of 1.08, and excellent view angle dependence.

Comparative Example 1

The procedure of Example 1 was repeated except that the prism array was not formed on the light diffusing plate substrate.

The obtained direct lighting device had an average luminance of 7,430 cd/m$^2$, a luminance uniformity of 1.56, and poor view angle dependence.

Comparative Example 2

The procedure of Comparative Example 1 was repeated except that a commercially available prism sheet (BEFII manufactured by Sumitomo 3M Limited) was interposed between two light diffusion films (Opals (trademark) BS-701 manufactured by Keiwa Co., Ltd.; underlying the prism film, total light transmittance of 89%, PBS-072; underlying the prism film, total light transmittance of 49%) and placed on the light diffusing plate substrate.

The obtained direct lighting device had an average luminance of 8,920 cd/m², a luminance uniformity of 1.36, and poor view angle dependence.

Comparative Example 3

The procedure of Example 1 was repeated except that a V groove-like prism array having uniform surfaces was formed on the entire emission surface of the light diffusing plate substrate at the time of forming a prism lens array by thermal pressing.

The obtained direct lighting device had an average luminance of 8,900 cd/m², a luminance uniformity of 1.28, and poor view angle dependence.

Comparative Example 4

The procedure of Comparative Example 3 was repeated except that the bottom shape of the light reflection housing was wavy.

The obtained direct lighting device had an average luminance of 9,500 cd/m², a luminance uniformity of 1.41, and poor view angle dependence.

Comparative Example 5

The procedure of Comparative Example 3 was repeated except that the light diffusing resin composition obtained in Manufacturing Example 3 was used.

The obtained direct lighting device had an average luminance of 10,000 cd/m², a luminance uniformity of 1.31, and poor view angle dependence.

Comparative Example 6

The procedure of Comparative Example 4 was repeated except that the thickness of the light diffusing plate substrate was made 1 mm in the extrusion molding step for manufacturing the light diffusing plate substrate.

The obtained direct lighting device had an average luminance of 8,600 cd/m², a luminance uniformity of 3.23, and poor view angle dependence.

The above results are shown in Table 1.

TABLE 1

| | Light diffusing plate | | | | |
|---|---|---|---|---|---|
| | Light diffusing plate substrate | | | Formation of optical element array | |
| | Manufacturing Example | Thickness (mm) | Total light transmittance (%) | Molding method | Optical element array |
| Example 1 | 1 | 2 | 93.8 | Extrusion | Compression molding | Lenticular |
| Example 2 | 2 | 2 | 93.5 | Extrusion | Compression molding | Lenticular |
| Example 3 | 3 | 2 | 85.0 | Extrusion | Compression molding | Lenticular |
| Example 4 | 4 | 2 | 91.5 | Extrusion | Compression molding | Lenticular |
| Example 5 | 5 | 2 | 94.0 | Injection compression | Lenticular |
| Example 6 | 6 | 2 | 92.0 | Injection compression | Lenticular |
| Example 7 | 7 | 2 | 93.5 | Injection compression | Lenticular |
| Comparative Example 1 | 1 | 2 | 93.8 | Extrusion | — | Not formed |
| Comparative Example 2 | 1 | 2 | 93.8 | Extrusion | — | Not formed |
| Comparative Example 3 | 1 | 2 | 93.8 | Extrusion | Compression molding | V groove-like prism |
| Comparative Example 4 | 1 | 2 | 93.8 | Extrusion | Compression molding | V groove-like prism |
| Comparative Example 5 | 3 | 2 | 85.0 | Extrusion | Compression molding | V groove-like prism |
| Comparative Example 6 | 1 | 1 | 96.5 | Extrusion | Compression molding | V groove-like prism |

| | | Optical film | | | |
|---|---|---|---|---|---|
| | Light reflecting plate | Type of light diffusion film, total light transmittance T (%), number of films | | Commercially available | |
| | Bottom shape of | Overlying the | Underlying the | prism lens | Evaluation results |
| | | | | | View angle |

TABLE 1-continued

| | light reflection housing | prism Film T = 49% | prism Film T = 89% | sheet Number of sheets | Average luminance (cd/m²) | Uniformity (—) | dependence (visual observation) |
|---|---|---|---|---|---|---|---|
| Example 1 | Planar | 0 | 2 | 0 | 10,000 | 1.10 | ○ |
| Example 2 | Wavy | 0 | 2 | 0 | 11,400 | 1.05 | ○ |
| Example 3 | Wavy | 0 | 2 | 0 | 9,600 | 1.02 | ○ |
| Example 4 | Wavy | 0 | 2 | 0 | 10,300 | 1.10 | ○ |
| Example 5 | Wavy | 0 | 2 | 0 | 10,500 | 1.07 | ○ |
| Example 6 | Wavy | 0 | 2 | 0 | 10,700 | 1.11 | ○ |
| Example 7 | Wavy | 0 | 2 | 0 | 10,600 | 1.08 | ○ |
| Comparative Example 1 | Planar | 1 | 1 | 0 | 7,430 | 1.56 | X |
| Comparative Example 2 | Planar | 1 | 1 | 1 | 8,920 | 1.36 | X |
| Comparative Example 3 | Planar | 1 | 1 | 0 | 8,900 | 1.28 | X |
| Comparative Example 4 | Wavy | 1 | 1 | 0 | 9,500 | 1.41 | X |
| Comparative Example 5 | Wavy | 1 | 1 | 0 | 10,000 | 1.31 | X |
| Comparative Example 6 | Wavy | 1 | 1 | 0 | 8,600 | 3.23 | X |

Manufacturing Example 8

Diffusing Plate for LED 0.25 part by mass of silicone beads (manufactured by Shin-Etsu Chemical Co., Ltd., average particle diameter of 5 μm) as a light diffusing material was mixed with 100 parts by mass of a polycarbonate resin (FN1900A manufactured by Idemitsu Kosan Co., Ltd.) as a thermoplastic transparent resin, and the resulting mixture was molten at 280° C. and kneaded by a kneading extruder having a bore diameter of 40 mm to obtain a light diffusing resin composition (pellet of a light diffusing material) having a total light transmittance of 85%.

The obtained light diffusing resin composition was extrusion molded at a molding temperature of 260° C. by using an extruder having a bore diameter of 65 mm to obtain a light diffusing plate substrate sheet having a width of 60 cm and a thickness of 2 mm.

The obtained light diffusing plate substrate was used to fabricate a light diffusing plate having two lenticular lenses (R2: end R (50 μm), pitch of 100 μm) which were formed orthogonal to each other on the front and rear surfaces by thermal press molding.

Manufacturing Example 9

Reflection Plate for LED

After 50 parts by mass of a polycarbonate resin (Taflon FN2500A manufactured by Idemitsu Kosan Co., Ltd.) was mixed with 50 parts by mass of titanium oxide and 1 part by mass of methoxysilicone, the resulting mixture was molten at 280° C. and kneaded by using a twin-screw extruder to obtain a pellet of a light reflecting composition.

The obtained pellet of a light diffusing resin composition was extrusion molded at a molding temperature of 260° C. by using an extruder having a bore diameter of 65 mm to obtain a sheet having a width of 60 cm and a thickness of 2 mm.

Figure 5:
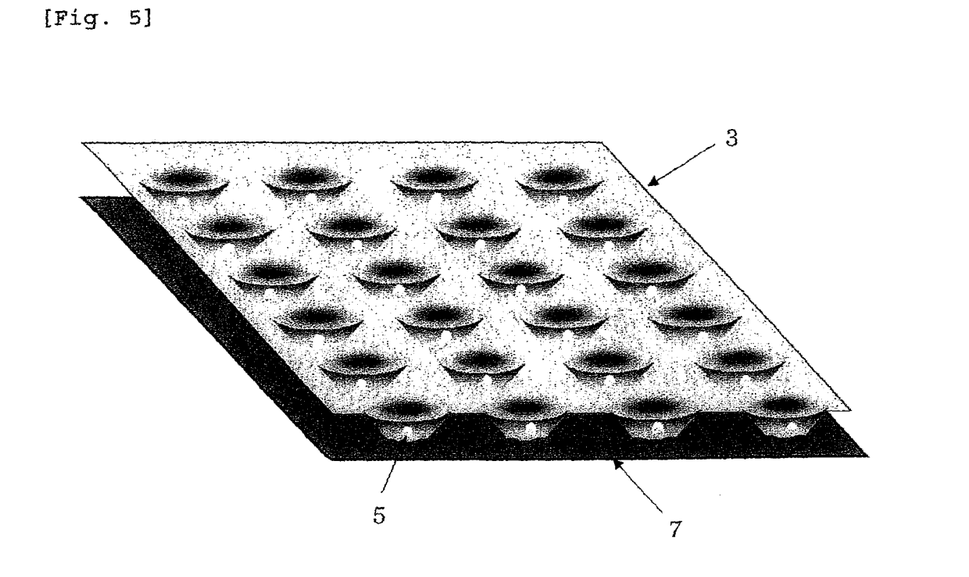
FIG. 5 is a diagram showing an example of the lighting device of the present invention including a reflecting plate having a parabolic reflector array structure, which is mounted on a metal substrate.
Figure 6:
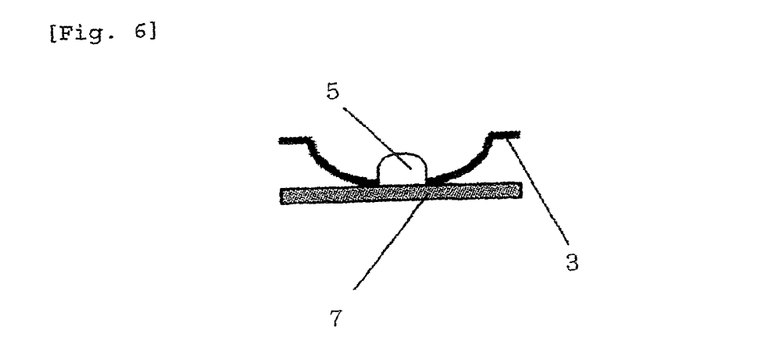
FIG. 6 is an example of a cross-sectional view of the lighting device shown in FIG. 5.

The obtained sheet was further molded into a reflection plate having a reflector array structure with a parabolic cross-section by using a thermal molding machine and, as shown in FIGS. 5 and 6, an extremely small portion of the cross-section parabola was punched out so that a light emitting portion of an LED light source was exposed from the surface of the reflection plate.

Example 8

Evaluation of Backlight

The light diffusing plate obtained in Manufacturing Example 8 and the reflection plate obtained in Manufacturing Example 9 were used, and 100 white LED light sources (LXHL-FW3C manufactured by Lumireds Co., Ltd.) were mounted in an array (the pitch of LED's was 40 mm). The reflection plate and the light diffusing plate were installed at an interval of 25 mm to measure luminance. The luminance was 11,000 cd/m² and the luminance uniformity was 1.02. The view angle dependence was excellent.

INDUSTRIAL APPLICABILITY

According to the present invention, there can be provided a light diffusing plate which eliminates luminance nonuniformity (making luminance uniform) in the number of light sources (interval between light sources) at a practical level and achieves high luminance (equal to luminance generated when a plurality of conventional prism sheets are laminated) by integrating a light diffusing plate substrate with an optical element array and a thin direct lighting device having the light diffusing plate.

The invention claimed is:

1. A light diffusing plate, comprising:
an optical element array integrally formed on front and rear surfaces of a light diffusing plate substrate to be mounted onto a direct lighting device,
wherein the optical element array comprises a microlens array which includes a lenticular lens array,
an arc at an end of the lenticular lens array formed on the front surface of the light diffusing plate substrate comprises ⅓ to ½ of a circle and an arc at the end of the lenticular lens array formed on the rear surface of the light diffusing plate substrate comprises 1/10 to ⅓ of a circle, and a material constituting the light diffusing plate substrate comprises a transparent resin or a light diffusing resin composition having a total light transmittance of 75 to 96%.

2. A direct lighting device, wherein the light diffusing plate of claim 1 is mounted on a light reflecting plate having a box-like shape and incorporating light sources inside thereof.

3. The direct lighting device according to claim 2, wherein one or two or more of optical films are formed on the light diffusing plate.

4. The direct lighting device according to claim 3, wherein the optical film formed on the light diffusing plate comprises a light diffusing film having a total light transmittance of 80% or higher.

5. The direct lighting device according to claim 2, wherein the light reflecting plate has a wavy or parabolic cross-section.

* * * * *